US010756316B2

(12) United States Patent
Kraehenbuehl et al.

(10) Patent No.: US 10,756,316 B2
(45) Date of Patent: Aug. 25, 2020

(54) DEVICE FOR MOUNTING AN ELECTRICAL SOURCE

(71) Applicant: ETA SA Manufacture Horlogere Suisse, Grenchen (CH)

(72) Inventors: David Benjamin Kraehenbuehl, Bettlach (CH); Martin Jufer, Melchnau (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 206 days.

(21) Appl. No.: 15/549,009

(22) PCT Filed: Dec. 2, 2015

(86) PCT No.: PCT/EP2015/078289
§ 371 (c)(1),
(2) Date: Aug. 4, 2017

(87) PCT Pub. No.: WO2016/124273
PCT Pub. Date: Aug. 11, 2016

(65) Prior Publication Data
US 2018/0034016 A1 Feb. 1, 2018

(30) Foreign Application Priority Data
Feb. 5, 2015 (EP) .................................... 15154011

(51) Int. Cl.
*H01M 2/10* (2006.01)
*G04C 10/00* (2006.01)

(52) U.S. Cl.
CPC .......... *H01M 2/1022* (2013.01); *G04C 10/00* (2013.01); *H01M 2/1044* (2013.01)

(58) Field of Classification Search
CPC .... G04C 10/00; H01M 2/1044; H01M 2/1022
USPC ......................................................... 429/163
See application file for complete search history.

(56) References Cited

U.S. PATENT DOCUMENTS

| 5,787,054 A | 7/1998 | Yasukawa et al. | |
| 5,805,423 A * | 9/1998 | Wever ................... | H05K 3/325 361/760 |
| 2003/0118893 A1 * | 6/2003 | Takahashi ............. | G04C 3/008 429/99 |

(Continued)

FOREIGN PATENT DOCUMENTS

| EP | 0 762 242 A1 | 3/1997 |
| JP | 52-82470 | 7/1977 |

OTHER PUBLICATIONS

International Search Report dated Feb. 19, 2016 in PCT/EP2015/078289 filed Dec. 2, 2015.

*Primary Examiner* — Jonathan G Jelsma
*Assistant Examiner* — Omar M Kekia
(74) *Attorney, Agent, or Firm* — Oblon, McClelland, Maier & Neustadt, L.L.P.

(57) ABSTRACT

A device for mounting an electrical energy source in portable electronic equipment is provided, including a cavity and a cover configured to close the cavity, the cover including a housing configured to receive the energy source, the cover and the portable electronic equipment having complementary fixing means in order to retain the cover on the portable electronic equipment and to seal the cavity, and the cover including means for retaining the energy source in the housing of the cover.

7 Claims, 2 Drawing Sheets

(56) References Cited

U.S. PATENT DOCUMENTS

2004/0121226 A1\* 6/2004 Kaelin ............... H01M 2/1044
429/96

\* cited by examiner

DEVICE FOR MOUNTING AN ELECTRICAL SOURCE

This is a National phase Application in the United States of International patent Application PCT/EP2015/078289 filed on Dec. 2, 2015 which claims priority of the European patent Application 15154011.9 filed on Feb. 5, 2015. The entire disclosure of the above patent application is hereby incorporated herein by reference.

FIELD OF THE INVENTION

The invention relates to the field of horology, and more particularly to devices for mounting an electrical source used in portable electronic equipment.

BACKGROUND OF THE INVENTION

A device for mounting a battery in an electronic watch comprising a housing for receiving the battery and a cover for closing the housing is known from document EP 1 432 052. The housing comprises, near the periphery thereof, elastic retaining means for retaining the battery in the housing, and the cover has means for clipping on the housing in order to allow retention of the cover on the housing.

Such a device has the disadvantage of using a housing for the battery which does not make it possible to lock the latter in rotation in the housing, which can cause corrosion of said electrode. Another disadvantage of this device is that the battery must firstly be pushed with force in order to be introduced into the housing, then the cover must be put in place.

Document FR 2 508 667 describes a cover which is intended to seal a battery opening. Locking of the cover is achieved by a bayonet system, the male part of which is formed by lugs of the cover and the female part of which is formed by radial housings.

Such a device likewise has the disadvantage of not providing good retention of the battery in the housing thereof, which entails a rotation risk of the battery and therefore of corrosion. In fact, the battery is simply deposited in the housing thereof, which does not prevent it turning and wearing when in contact with the electrodes present in the housing thereof. Furthermore, this device does not allow simple and rapid mounting of the cover on the bottom of the watch casing.

Documents JP S52 82470 and EP 0 762 242 likewise disclose a device for mounting an energy source and have the disadvantage of not providing reliable retention of the energy source in the housing thereof.

SUMMARY OF THE INVENTION

The object of the invention is in particular to remedy the various disadvantages of these known techniques.

More precisely, one object of the invention is to provide a battery cover which gives good retention of the battery in the housing thereof.

The object of the invention is likewise, at least in one particular embodiment, to provide a device for mounting a battery which is both simple and inexpensive to implement.

These objects, and also others which will appear more clearly subsequently, are achieved according to the invention with the help of a device for mounting an electrical energy source in a portable electronic watch, comprising a cavity and a cover for closing the cavity, the cover comprising a bottom, an annular wall rising from the bottom and forming a housing which is able to receive the energy source, the cover and the portable electronic watch having complementary fixing means provided in order to retain the cover on the portable electronic watch and to seal the cavity, the annular wall of the cover comprises means for retaining the energy source in the housing of the cover, the retaining means forming a monobloc part with the annular wall.

According to the invention, the means for retaining the energy source comprise support lugs which are configured to compensate for the tabs.

Thus, the subject of the present invention, by the various functional and structural aspects thereof described above, makes it possible to obtain a battery cover which is easy to install whilst retaining the battery radially and in rotation in the cover.

According to other advantageous variants of the invention:
- the means for retaining the energy source comprise tabs which have a semi-circular section;
- the tabs are produced in a deformable plastic material;
- the tabs each comprise a chamfered portion so as to facilitate introduction of the energy source into the cover;
- the cover comprises at least two clips configured to cooperate with corresponding clip openings formed in the cavity;
- the clip openings comprise a notch formed near the entry thereof, each notch being configured to cooperate with the at least two clips;
- the tabs, the support lugs and the clipping means form a monobloc part with the cover, the latter being obtained by injection of plastic material.

The invention also relates to electronic equipment comprising electronic circuits supplied by an electrical energy source, such as a battery, equipped with a device for mounting the electrical energy source according to the invention.

BRIEF DESCRIPTION OF THE DRAWINGS

Other features and advantages of the invention will appear more clearly upon reading the following description of a particular embodiment of the invention, given simply by way of illustrative and non-limiting example, and annexed Figures, amongst which.

DETAILED DESCRIPTION OF PREFERRED EMBODIMENTS

A mounting device according to a particular embodiment will now be described, in which reference is made jointly to FIGS. 1, 2 and 3.

The device comprises a cavity 2 of a cylindrical shape, for example, and has a circular opening by means of which a cover 1 which has a housing 10 able to receive and retain an energy source such as a button battery 3 can be introduced. Advantageously, the cover 1 and the portable electronic equipment have complementary fixing means such as clips, provided in order to retain the cover 1 on the portable electronic equipment and to seal the cavity 2.

Figure 1:
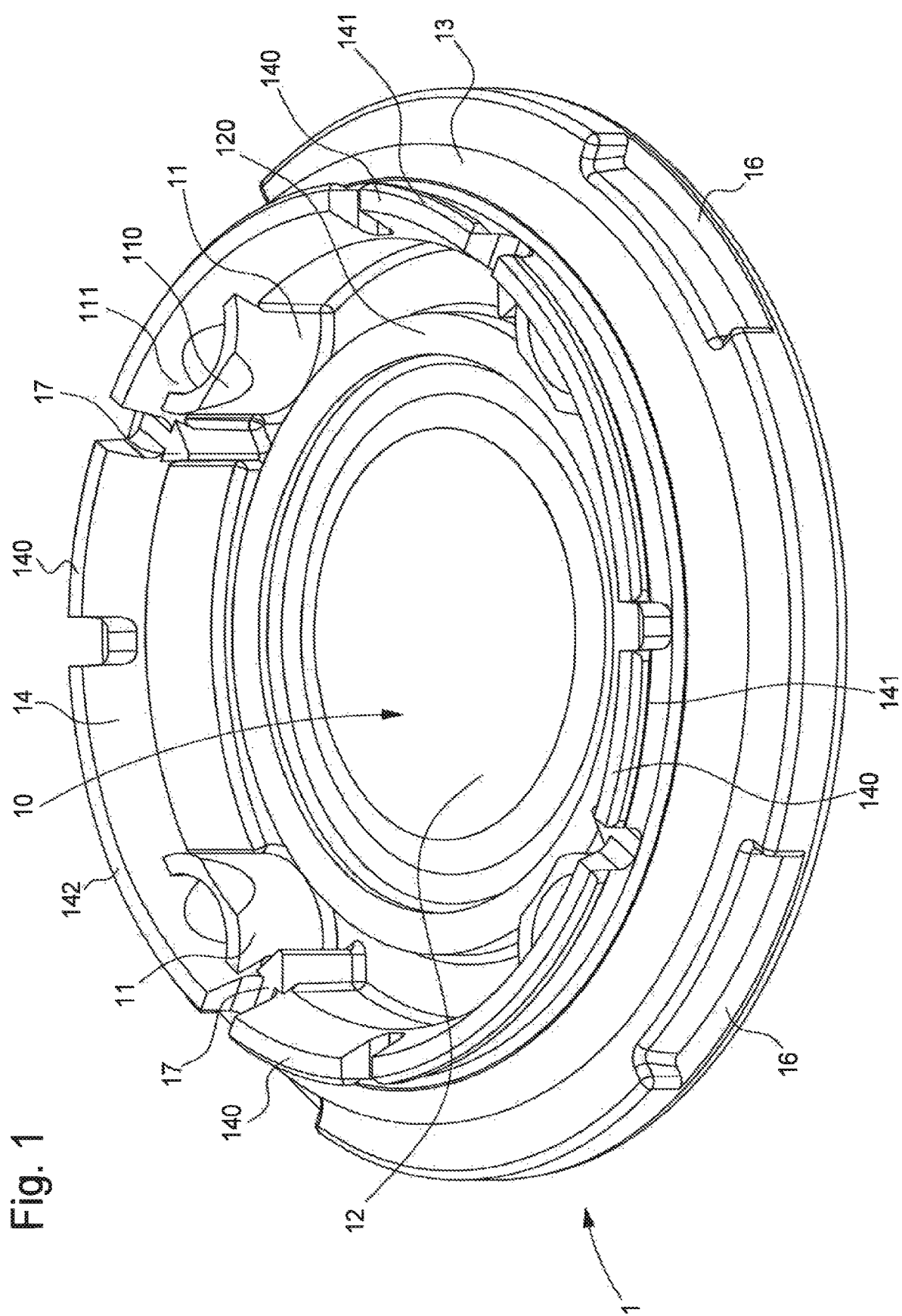
FIG. 1 is a perspective view of a battery cover according to the device of the invention.

As can be seen in FIG. 1, the cover 1 comprises tabs 11 which are disposed at a spacing on the periphery of the housing 10. Each of the tabs 11 is connected to the bottom 12 of the housing 10 and extends vertically from the bottom 12. Each of the tabs 11 is in the shape of a semi-circular sectional portion and ends via a chamfered portion 110. The opening thus defined by the tabs 11 in the middle of the housing 10 has dimensions which are less than the dimensions of the battery 3.

Advantageously, the chamfered portion 110 makes it possible to introduce the battery easily into the housing 10 of the cover 1.

It can be seen in FIG. 1 that the cover 1 has an annular wall 14 which projects relative to the bottom 12 of the housing 10. The periphery of the cover 1 has an annular shoulder 13 which is configured to receive an O-ring seal 4, the O-ring seal 4 then being attached around the annular wall 14.

The annular wall 14 has sections of different lengths, and in particular four portions, termed clips 140, of a lesser length relative to the rigid portions 142. The clips 140 have, on the outer edge thereof, a clip notch 141.

The cover 1 also comprises recesses 16 for positioning, on the periphery thereof, the recesses 16 being open on the peripheral edge of the cover 1.

Figure 2:
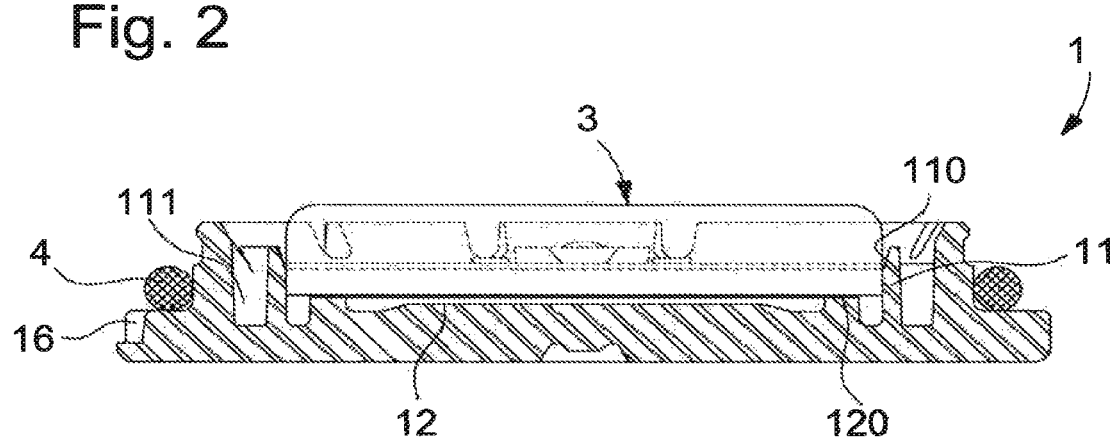
FIG. 2 is a sectional view of a battery cover according to the device of the invention.

FIG. 2 represents a sectional view of the battery cover, illustrated in FIG. 1, the battery 3 being disposed inside the housing 10 of the cover 1.

The respective dimensions of the battery 3 and of the housing 10 are such that the latter is able to receive the battery 3, the battery 3 being supported against a circular limit stop 120 formed on the bottom 12 of the housing 10 and the edge of the battery 3 being supported against the tabs 11. Advantageously, the circular limit stop 120 formed on the bottom 12 has a diameter similar to that of the battery 3.

According to a preferred embodiment, support lugs 17 for the battery can be provided near the tabs 11 on the inner wall of the housing 10. The support lugs 17 are provided as a supplement to the tabs 11 so that if a tab 11 comes to be broken or to be deformed too much, the adjacent support lug 17 compensates for the tab 11 which is broken/too deformed. The support lugs 17 can be produced in a compressible material which exerts great friction on the battery, in order to prevent the latter from turning around.

The housing 10 comprises, on the periphery thereof, recesses 111 which are delimited on the one hand by the annular wall 14 of the housing 10 and, on the other hand, by the tabs 11. The tabs 11, produced preferably in a flexible material, can thus be deformed towards the corresponding recess 111 when the battery 3 is positioned in the housing 10. In fact, the tabs 11, as illustrated in FIGS. 1 and 2, are preferably produced in a plastic material which has elastic properties. For this reason and given the respective dimensions of the housing 10, the tabs 11 and the battery 3, introduction of the battery into the housing 10 is effected by positioning of the battery 3 on the chamfered portion 110 of the tabs 11, followed by pressure exerted on the battery 3 in the direction of the bottom 12 of the housing 10. During positioning of the battery 3, the tabs 11 are simultaneously deformed in the direction of the recess 111, which causes elastic deformation of the tabs 11 and allows introduction by force of the battery 3 into the housing 10 of the cover 1.

Once the battery 3 is positioned against the bottom 12 of the housing 10, the tabs 11 tend to resume their respective initial shape thanks to the elasticity thereof, which makes it possible to ensure retention of the battery 3 and to prevent it turning once in position in the cover 1.

A system for fixing the cover 1 in the cavity 2 is furthermore provided. Each of the clips 140 is provided with a clip notch 141 on the outer surface thereof, which extends from one edge of the clip 140 to the other. The wall of the cavity 2 has, on the inner surface thereof, a corresponding opening 20 for each clip notch 141. The corresponding openings 20 have a notch 21 near the entry thereof, each notch 21 being intended to cooperate with a clip notch 141 of a clip 140. Hence, when the cover 1 is disposed in the cavity 2, the totality of the clip notches 141 and the notches 21 is situated one opposite the other and cooperate so as to retain the cover 1 in the cavity 2 by clipping.

Figure 3:
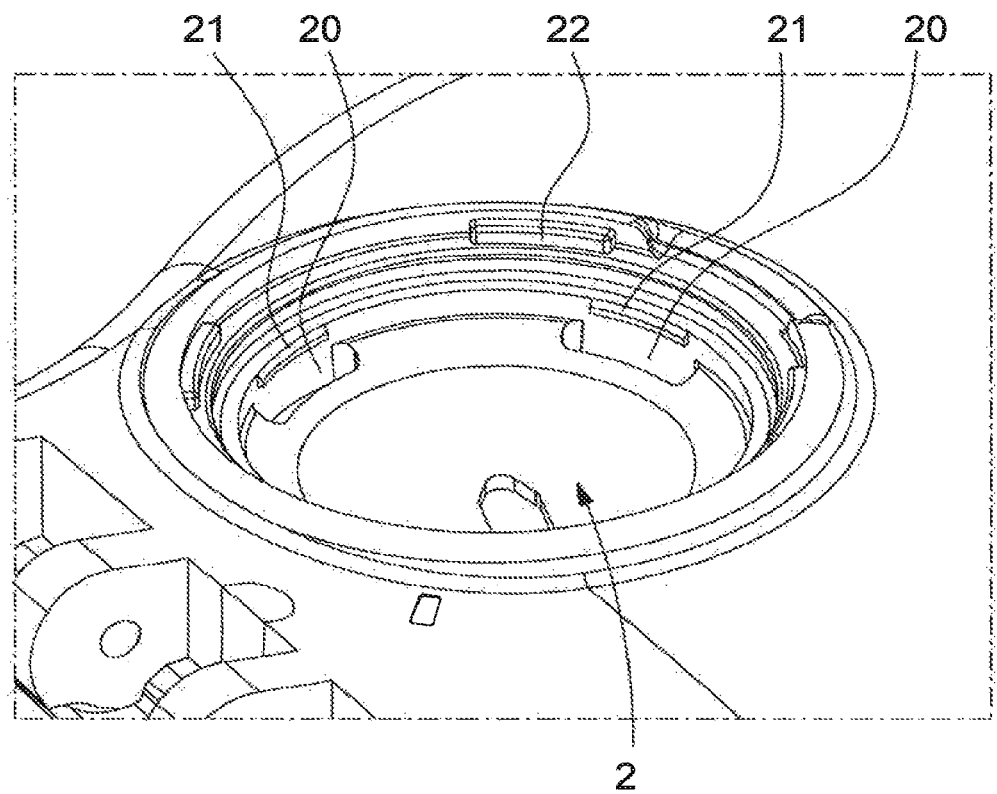
FIG. 3 is a perspective view of a watch casing comprising a device according to the invention.

It can likewise be seen in FIG. 3 that the cavity 2 has, near the edges of the opening thereof, positioning feet 22 which are configured to cooperate with the recesses 16 of the cover 14 and thus to position the cover well on the cavity 2.

It can be noted that the means for electrical connection of the battery poles have been neither described, nor illustrated, in so far as they are produced in a conventional manner and make no particular contribution to the present invention. The person skilled in the art will encounter no particular difficulty in using them.

The preceding description corresponds to a preferred embodiment and should not be considered in any way to be limiting, as far as concerns, more particularly, the shape described for the various structural elements comprising the mounting device or the materials thereof. The person skilled in the art will encounter no particular difficulty in choosing, for example, for the means for retaining the battery, any other material which has the mechanical properties required for implementing the present invention.

The possible applications for such a device for battery mounting are very numerous since the present invention can be used for any type of portable electronic equipment, in particular on the hand or on the wrist, such as for example an electronic watch strap.

PARTS LIST

1. Cover,
10. Housing,
11. Tab,
110. Chamfered portion,
111. Recesses,
12. Bottom of the cover,
120. Limit stop,
13. Annular shoulder,
14. Annular wall of the housing,
140. Clips,
141. Clip notch,
142. Rigid portions,
16. Recesses,
17. Support lugs,
2. Cavity,
20. Opening,
21. Notch,
22. Positioning foot,
3. Battery,
4. O-ring seal.

The invention claimed is:

1. A device for mounting an electrical energy source in a portable electronic watch, comprising:
   a cavity the portable electronic watch; and
   a cover configured to close the cavity, the cover comprising a bottom, an annular wall rising from the bottom, and forming a housing configured to receive the energy source, the cover and the portable electronic watch having complementary fixing means configured to retain the cover on the portable electronic watch and to seal the cavity, the fixing means comprising at least two clips disposed on an outer surface of the cover and at least two corresponding notches disposed on the portable electronic watch, wherein the annular wall of the cover comprises retaining means configured to retain the energy source in the housing of the cover independent of the cavity, the retaining means comprising tabs having a semi-circular section and forming a monobloc part with the annular wall, the tabs being disposed at a spacing on an inner surface of the cover and defining an opening therein having a radial dimension that is less than that of the energy source, and support lugs configured to compensate for the tabs and being disposed on the inner surface of the cover.

2. The mounting device according to claim 1, wherein the tabs are produced in a deformable plastic material.

3. The mounting device according to claim 1, wherein the tabs each comprise a chamfered portion configured to facilitate introduction of the energy source into the housing of the cover.

4. The mounting device according to claim 1, wherein the at least two clips are configured to cooperate with corresponding clip openings formed in the cavity.

5. The mounting device according to claim 4, wherein the corresponding clip openings comprise the at least two corresponding notches being formed near an entry thereof, the at least two corresponding notches being configured to cooperate with the at least two clips.

6. The mounting device according to claim 1, wherein the tabs, the support lugs, and the retaining means form a monobloc part with the cover, the cover being obtained by injection of plastic material.

7. An electronic equipment, comprising:
electronic circuits supplied with an electrical energy source including a battery; and
a device configured to mount the electrical energy source in a portable electronic watch, comprising:
a cavity in the portable electronic watch, and
a cover configured to close the cavity, the cover comprising a bottom, an annular wall rising from the bottom, and forming a housing configured to receive the energy source,
the cover and the portable electronic watch having complementary fixing means configured to retain the cover on the portable electronic watch and to seal the cavity, the fixing means comprising at least two clips disposed on an outer surface of the cover and at least two corresponding notches disposed on the portable electronic watch,
wherein the annular wall of the cover comprises retaining means configured to retain the energy source in the housing of the cover independent of the cavity, the retaining means comprising
tabs having a semi-circular section and forming a monobloc part with the annular wall, the tabs being disposed at a spacing on an inner surface of the cover and defining an opening therein having a radial dimension that is less than that of the energy source, and
support lugs configured to compensate for the tabs and being disposed on the inner surface of the cover.

* * * * *

UNITED STATES PATENT AND TRADEMARK OFFICE
CERTIFICATE OF CORRECTION

PATENT NO. : 10,756,316 B2
APPLICATION NO. : 15/549009
DATED : August 25, 2020
INVENTOR(S) : David Benjamin Kraehenbuehl et al.

Page 1 of 1

It is certified that error appears in the above-identified patent and that said Letters Patent is hereby corrected as shown below:

In the Claims

Column 4, Line 63, Claim 1, after "cavity" insert -- in --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*